(12) United States Patent
Na

(10) Patent No.: US 11,254,179 B2
(45) Date of Patent: Feb. 22, 2022

(54) VEHICLE HEIGHT CONTROL APPARATUS AND METHOD CONSIDERING STRONG WIND TRAVELING SITUATION

(71) Applicants: HYUNDAI MOTOR COMPANY, Seoul (KR); KIA MOTORS CORPORATION, Seoul (KR)

(72) Inventor: Eun-Woo Na, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 192 days.

(21) Appl. No.: 16/694,066

(22) Filed: Nov. 25, 2019

(65) Prior Publication Data

US 2020/0346508 A1    Nov. 5, 2020

(30) Foreign Application Priority Data

May 2, 2019    (KR) .................. 10-2019-0051457

(51) Int. Cl.
*B60G 17/0165* (2006.01)
*B60W 40/105* (2012.01)
(Continued)

(52) U.S. Cl.
CPC ......... *B60G 17/0165* (2013.01); *B62D 35/00* (2013.01); *B60G 17/0525* (2013.01); *B60G 2400/841* (2013.01); *B60G 2500/30* (2013.01); *B60G 2800/914* (2013.01); *B60W 40/105* (2013.01); *B60W 2555/20* (2020.02)

(58) Field of Classification Search
None
See application file for complete search history.

(56) References Cited

U.S. PATENT DOCUMENTS

| 8,185,269 B2 | 5/2012 | Li et al. |
| 2015/0032332 A1* | 1/2015 | Kikuchi ............... B60W 10/06 701/37 |

(Continued)

FOREIGN PATENT DOCUMENTS

| JP | H06-247125 A | 9/1994 |
| JP | 2000-322695 A | 11/2000 |
| JP | 2004-299644 A | 10/2004 |

*Primary Examiner* — Lail A Kleinman
(74) *Attorney, Agent, or Firm* — Morgan, Lewis & Bockius LLP

(57) ABSTRACT

A vehicle height control apparatus considering a strong wind traveling situation may include: a strong wind zone determining unit for obtaining wind speed information of a current position by using map information to which the wind speed information is corresponded and current position information of a vehicle, and generating strong wind zone information by comparing the obtained wind speed information with a predetermined reference wind speed to determine a strong wind zone; a strong wind traveling situation determining unit for generating strong wind traveling situation information by determining the strong wind traveling situation based on the strong wind zone information and the vehicle speed information of the current position; and a control signal generating unit for generating a control signal of a vehicle height adjusting device according to the strong wind traveling situation information.

19 Claims, 3 Drawing Sheets

(51) Int. Cl.
*B60G 17/052* (2006.01)
*B62D 35/00* (2006.01)

(56) References Cited

U.S. PATENT DOCUMENTS

2017/0129298 A1* 5/2017 Lu ........................ B60G 17/015
2017/0137023 A1* 5/2017 Anderson ............. B60W 10/22
2018/0162400 A1* 6/2018 Abdar .............. G08G 1/096741

* cited by examiner

VEHICLE HEIGHT CONTROL APPARATUS AND METHOD CONSIDERING STRONG WIND TRAVELING SITUATION

CROSS-REFERENCE TO RELATED APPLICATION

This application claims priority to Korean Patent Application No. 10-2019-0051457, filed on May 2, 2019 in the Korean Intellectual Property Office, which is incorporated herein by reference in its entirety.

TECHNICAL FIELD

The present disclosure relates to a vehicle height control apparatus and method considering a strong wind traveling situation, and more particularly, to a vehicle height control apparatus and method considering a strong wind traveling situation, which controls a vehicle height adjusting device or a braking device considering the strong wind traveling situation that determines a vehicle speed and a strong wind zone in combination.

BACKGROUND

Generally, a suspension system in a vehicle is a system for connecting an axle and a frame, and absorbing vibration and shock received from the road surface during traveling, thereby enhancing riding quality and safety of the vehicle.

The suspension system needs to be flexible in a vertical connection in order to mitigate the shock on the road surface, and a horizontal connection, which may overcome a driving force, a braking force, and a centrifugal force upon turning generated in a wheel, should be robust.

Then, the suspension system may be classified into a solid axle suspension mechanically configured, an independent suspension, and an air suspension using air pressure, i.e., an air suspension.

The air suspension may have a vehicle height adjusting device for adjusting the vehicle height according to the amount of air injected into an air spring, thereby providing comfortable riding quality to a passenger. In this case, an air suspension control device controls an operation of the air suspension by controlling the vehicle height adjusting device by using a Controller Area Network (CAN) communication.

The control logic of the air suspension control device may be largely classified into a reference vehicle height keeping control, a rough road control, and a high-speed vehicle height control.

First, when performing the reference vehicle height keeping control, the air suspension control device performs a vehicle height control for returning to the reference vehicle height when a current vehicle height exceeds a target vehicle height by a certain magnitude or more. This performs for keeping the balance of the vehicle when it is necessary to keep the reference vehicle height due to an increase in a vehicle weight.

Next, when performing the rough road control, the air suspension control device performs a vehicle height control for raising the vehicle height of a vehicle when the vehicle travels on the rough road at a medium/low speed or less. This performs for enhancing the riding quality and preventing a vehicle body from being broken due to ride-height elevation. Then, when performing a high speed vehicle height control, the air suspension control device performs a vehicle height control for lowering the vehicle height of the vehicle when the vehicle travels at a high speed for a certain time or more. This performs for reducing the fuel efficiency and enhancing the steering stability.

However, as described above, the vehicle height control apparatus including the air suspension control device does not have the control logic against aerodynamic resistance when passing through a strong wind zone separately from a vehicle speed condition. That is, conventionally, there has been prepared the control logic for performing the vehicle height control against the aerodynamic resistance when the vehicle travels at a high speed, but there has not been prepared the control logic for performing the vehicle height control against the aerodynamic resistance due to the strong wind even if the vehicle travels at a medium/low speed.

Therefore, the vehicle height control apparatus needs a method for performing the vehicle height control for lowering the vehicle height considering the strong wind zone separately from the vehicle speed condition.

The contents described in Description of Related Art are to help the understanding of the background of the present disclosure, and may include what is not previously known to those skilled in the art to which the present disclosure pertains.

SUMMARY OF THE DISCLOSURE

An object of the present disclosure is to provide a vehicle height control apparatus and method considering a strong wind traveling situation, which controls a vehicle height adjusting device or a braking device considering a strong wind traveling situation that determines a vehicle speed and a strong wind zone in combination, thereby enhancing steering stability and fuel efficiency through a vehicle height control with respect to the wind and the vehicle speed on the traveling path of a vehicle.

A vehicle height control apparatus considering a strong wind traveling situation according to an embodiment of the present disclosure may include: a strong wind zone determining unit for obtaining wind speed information of a current position by using map information to which the wind speed information is corresponded and current position information of a vehicle, and generating strong wind zone information by comparing the obtained wind speed information with a predetermined reference wind speed to determine a strong wind zone; a strong wind traveling situation determining unit for generating strong wind traveling situation information by determining the strong wind traveling situation based on the strong wind zone information and the vehicle speed information of the current position; and a control signal generating unit for generating a control signal of a vehicle height adjusting device according to the strong wind traveling situation information.

The vehicle height control apparatus may further include a communicating unit for receiving the map information to which the wind speed information is corresponded from an external device; a map information updating unit for updating the map information to which the wind speed information is corresponded transferred from the communicating unit; and a map information storing unit for storing the map information to which the wind speed information is corresponded updated by the map information updating unit to provide it to the strong wind zone determining unit.

The external device may be at least one of a V2X device for providing information through a V2X communication network, and a driver terminal for providing information through an internal modem mounted inside the vehicle.

The strong wind zone information may be defined as a strong wind zone when the wind speed information is equal to or greater than a predetermined reference wind speed.

The strong wind zone information may define a plurality of strong wind zones through a plurality of reference wind speeds.

The strong wind traveling situation information may be confirmed as a strong wind zone through the strong wind zone information, and defined as a strong wind traveling situation when it is confirmed that an actual vehicle speed is equal to or greater than a predetermined reference vehicle speed through the vehicle speed information.

The strong wind traveling situation information may define a plurality of strong wind traveling situations through a plurality of reference vehicle speeds.

The strong wind traveling situation information may define a plurality of strong wind traveling situations through a plurality of strong wind zones.

The control signal generating unit may obtain the respective control signals according to the plurality of strong wind traveling situations to transmit it to the vehicle height adjusting device.

The strong wind zone information may be defined as a dangerous strong wind zone when the wind speed information is equal to or greater than a predetermined dangerous reference wind speed, the strong wind traveling situation information may be confirmed as a dangerous strong wind zone through the strong wind zone information and defined as a dangerous strong wind traveling situation when it is confirmed that an actual vehicle speed is equal to or greater than a predetermined dangerous reference vehicle speed through the vehicle speed information, and the control signal generating unit may generate a control signal for controlling a braking device of the vehicle according to the strong wind traveling situation information in which the dangerous strong wind traveling situation has been defined.

The strong wind traveling situation determining unit may previously determine a vehicle height adjusting execution time point of the vehicle height adjusting device considering the distance between the current position of the vehicle and the starting position of the strong wind zone on the traveling path of the vehicle.

At least one of the map information updating unit, the strong wind zone determining unit, the strong wind traveling situation determining unit, and the control signal generating unit may be composed of an integral controller.

A vehicle height control method considering a strong wind traveling situation according to another exemplary embodiment of the present disclosure may include obtaining wind speed information of a current position by using map information to which the wind speed information is corresponded and current position information of a vehicle; generating strong wind zone information by comparing the obtained wind speed information with a predetermined reference wind speed to determine a strong wind zone; generating strong wind traveling situation information by determining the strong wind traveling situation based on the strong wind zone information and vehicle speed information of the current position; and generating a control signal of a vehicle height adjusting device according to the strong wind traveling situation information.

The vehicle height control method considering the strong wind traveling situation may further include receiving the map information to which the wind speed information is corresponded from an external device before obtaining the wind speed information; updating the received map information to which the wind speed information is corresponded; and storing and providing the updated 'map information to which the wind speed information is corresponded.'

The generating the control signal of the vehicle height adjusting device may obtain the respective control signals according to the plurality of strong wind traveling situations to transmit it to the vehicle height adjusting device.

The strong wind zone information may be defined as a dangerous strong wind zone when the wind speed information is equal to or greater than a predetermined dangerous reference wind speed, the strong wind traveling situation information may be confirmed as a dangerous strong wind zone through the strong wind zone information and defined as a dangerous strong wind traveling situation when it is confirmed that an actual vehicle speed is equal to or greater than a predetermined dangerous reference vehicle speed through the vehicle speed information, and the generating the control signal of the vehicle height adjusting device may generate a control signal for controlling a braking device of the vehicle according to the strong wind traveling situation information in which the dangerous strong wind traveling situation has been defined.

The present disclosure may control the vehicle height adjusting device or the braking device considering the strong wind traveling situation that determines the vehicle speed and the strong wind zone in combination, thereby enhancing the steering stability and the fuel efficiency through the vehicle height control with respect to the wind and the vehicle speed on the traveling path of the vehicle.

In addition, the present disclosure may increase the fuel efficiency effect through an appropriate vehicle height control with respect to the wind.

In addition, the present disclosure may solve the instability of the vehicle behavior due to the horizontal wind.

DESCRIPTION OF SPECIFIC EMBODIMENTS

Figure 1:
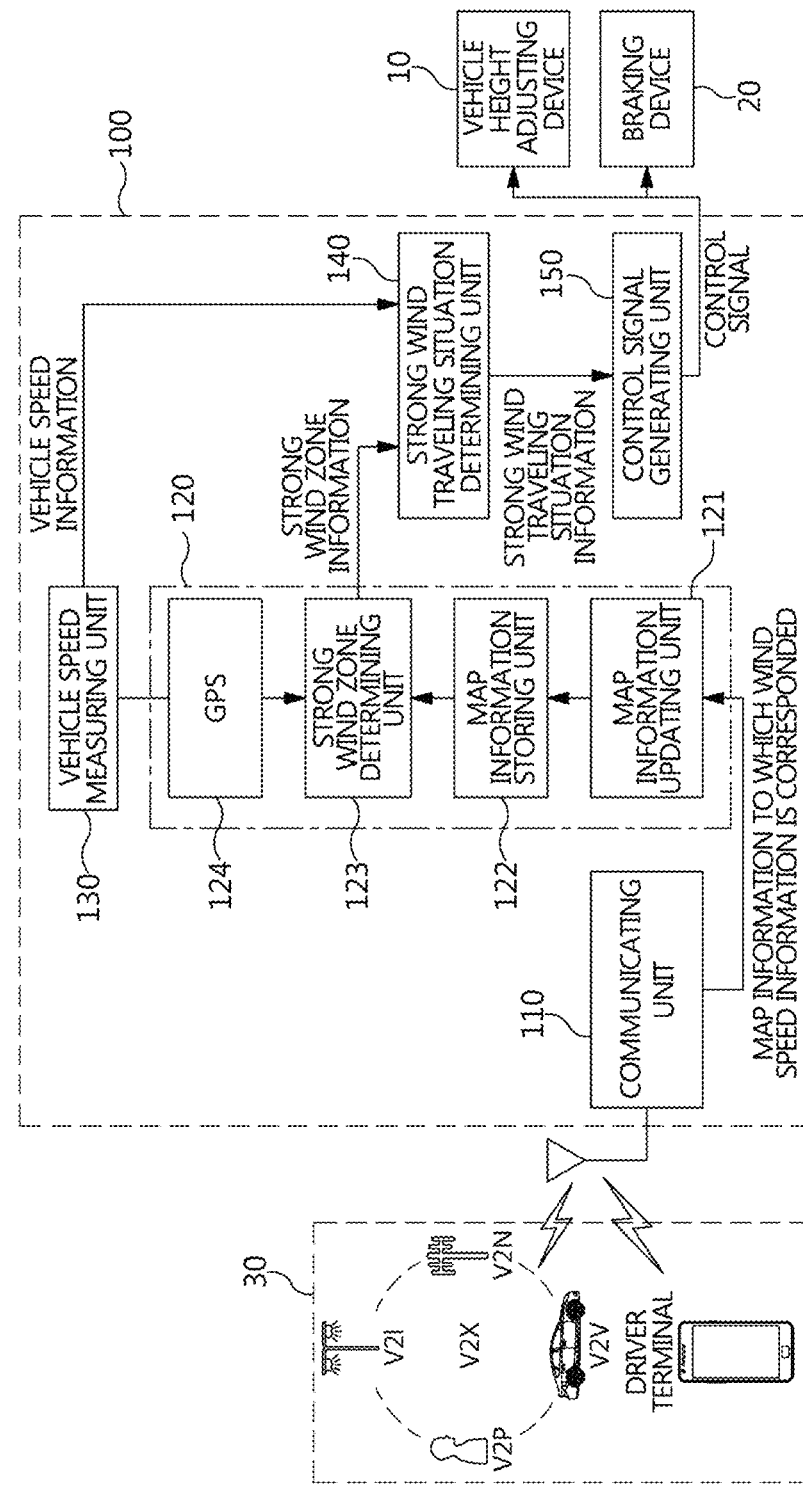
FIG. 1 is a diagram illustrating a vehicle height control apparatus considering a strong wind traveling situation according to an exemplary embodiment of the present disclosure.

Hereinafter, exemplary embodiments of the present disclosure will be described in detail with reference to the accompanying drawings. However, in the following description and the accompanying drawings, a detailed description of known functions or configurations that may obscure the subject matter of the present disclosure will be omitted. In addition, it should be noted that the same components are denoted by the same reference numerals as much as possible throughout the entire drawings.

The terms or the words used in the present specification and the claims described below should not be construed as limited to general or dictionary meanings, and should be construed based on the meanings and concepts corresponding to the technical spirit of the present disclosure on the basis of the principle that the inventor may appropriately define his/her own invention as the terms for the best explanation.

Therefore, the embodiments described in the present specification and the configurations illustrated in the drawings are merely the most preferred one embodiment of the present disclosure, and not intended to represent all of the technical spirits of the present disclosure, such that it should be understood that various equivalents and modifications may be substituted for those at the time of filing the present application.

Some elements are exaggerated, omitted, or schematically illustrated in the accompanying drawings, and actual sizes of respective elements are not necessarily represented in the drawings. The present disclosure is not limited by relative sizes or intervals illustrated in the accompanying drawings.

Throughout the entire specification, when a certain portion "includes" a certain component, this means that the other components are not excluded, but may be further included unless specially described otherwise. In addition, when a certain portion is "connected" to another portion, it may be "directly connected" or "electrically connected" with other elements interposed therebetween.

The singular forms include the plural forms unless the context clearly indicates otherwise.

It should be understood that the terms "comprises" or "includes," etc. specify the presence of features, integers, steps, operations, components, parts or a combination thereof described in the specification, but do not preclude the presence or addition possibility of one or more other features, integers, steps, operations, components, parts or a combination thereof.

In addition, the term "unit" as used in the specification means a software or hardware component, such as FPGA or ASIC, and the "unit" performs any functions. However, the "unit" does not mean to be limited to software or hardware. The "unit" may be configured in the addressable storage medium and also configured to execute one or more processors. Therefore, the "unit" may include, as an example, components, such as software components, object-oriented software components, class components, and task components, processes, functions, attributes, procedures, subroutines, segments of a program code, drivers, firmware, microcode, circuitry, data, databases, data structures, tables, arrays, and variables. The functionality provided for in the components and "units" may be combined into fewer components and "units" or further separated into additional components and "units."

Hereinafter, exemplary embodiments of the present disclosure will be described in detail with reference to the accompanying drawings so that those skilled in the art to which the present disclosure pertains may easily practice the present disclosure. However, the present disclosure may be implemented in various different forms, and is not limited to the embodiments described herein. Then, in the drawings, portions which are not related to the description of the present disclosure are omitted in order to clearly describe the present disclosure, and similar portions are denoted by similar reference numerals throughout the entire specification.

Hereinafter, exemplary embodiments of the present disclosure will be described with reference to the accompanying drawings.

Figure 2:
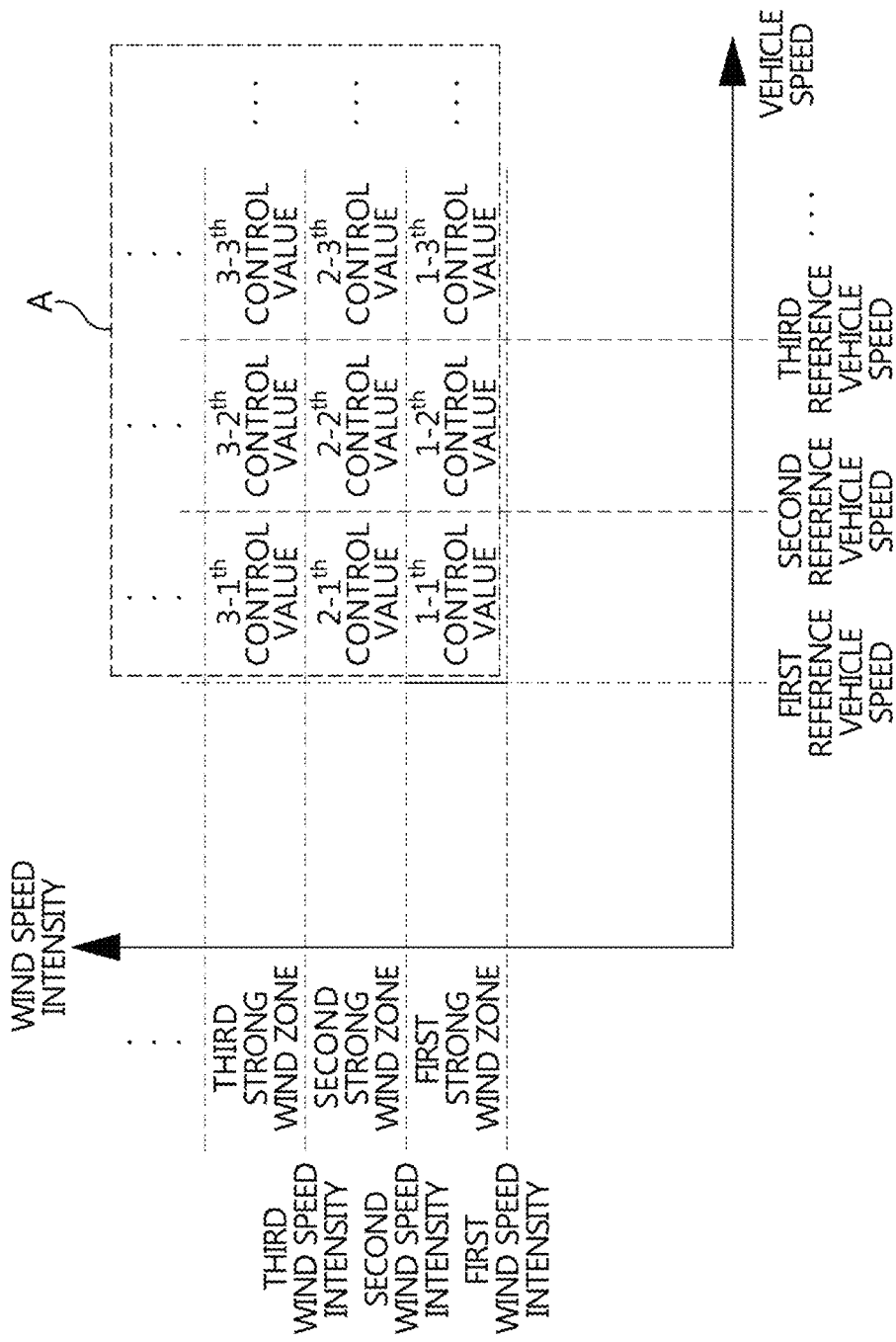
FIG. 2 is a diagram for explaining a control signal generating matrix according to a plurality of strong wind traveling situations.

FIG. 1 is a diagram illustrating a vehicle height control apparatus considering a strong wind traveling situation according to an exemplary embodiment of the present disclosure, and FIG. 2 is a diagram for explaining a control signal generating matrix according to a plurality of strong wind traveling situations.

As illustrated in FIG. 1, a vehicle height control apparatus 100 considering a strong wind traveling situation according to an exemplary embodiment of the present disclosure may control a vehicle height adjusting device 10 or a braking device 20 considering a strong wind traveling situation that determines a vehicle speed and a strong wind zone in combination, thereby enhancing steering stability and fuel efficiency through a vehicle height control with respect to the wind and the vehicle speed on the traveling path of a vehicle.

The vehicle height control apparatus 100 includes a communicating unit 110, a navigation unit 120, a vehicle speed measuring unit 130, a strong wind traveling situation determining unit 140, and a control signal generating unit 150. The navigation unit 120 includes a map information updating unit 121, a map information storing unit 122, a strong wind zone determining unit 123, and a GPS 124.

In the present disclosure, the communicating unit 110 may be a hardware device capable of transmitting an analog or digital signal over the telephone, other communication wires, or wirelessly. Examples thereof include Bluetooth devices, infrared devices, Modems, a network card, smartphone, Wi-Fi devices, etc. In addition, the communicating n unit 110 may include a communication module for wireless Internet access or a communication module for short-range communication. Here, a wireless Internet technology may include a wireless LAN (WLAN), a wireless broadband (Wibro), a Wi-Fi, a World Interoperability for Microwave Access (Wimax), and the like. Further, a short-range communication technology may include Bluetooth, ZigBee, Ultra Wideband (UWB), Radio Frequency Identification (RFID), Infrared Data Association (IrDA), and the like.

The navigation unit 120 may be a device that is capable of receiving information from GPS satellites and then calculating the device's geographical position. The navigation unit 120 may display the position on a map, and it may offer directions to a user.

The vehicle speed measuring unit 130 may be a wheel speed sensor or vehicle speed sensor (VSS) which is a type of tachometer for reading the speed of a vehicle.

The strong wind traveling situation determining unit 140 may be an electronic control unit (ECU) or any other processor (e.g., computer, microprocessor, ASIC, logic circuitry, central processing unit (CPU), etc.), as will be described below.

The control signal generating unit 150 may be an electronic device that generates repeating or non-repeating electronic signals in either the analog or digital domain, as will be further described below.

Herein, the map information updating unit 121, the strong wind zone determining unit 123, the strong wind traveling situation determining unit 140, and the control signal generating unit 150 may include at least one processor and a memory for storing computer-readable instructions. Each of these may perform the steps of the vehicle height control method considering the strong wind traveling situation according to an embodiment of the present disclosure by executing the computer-readable instructions stored in the memory by at least one processor.

Then, at least one of the map information updating unit 121, the strong wind zone determining unit 123, the strong wind traveling situation determining unit 140, and the control signal generating unit 150 may be composed of an integral controller. Herein, the integral controller may include at least one processor and a memory for storing the computer-readable instructions.

Hereinafter, each component of the vehicle height control apparatus 100 will be described in detail.

First, the communicating unit 110 receives map information to which wind speed information is corresponded from an external device 30 to transfer it to the navigation unit 120.

The external device 30 may directly generate and provide the '=map information to which the wind speed information is corresponded, or indirectly receive and provide it.

Herein, the map information to which the wind speed information is corresponded may be the map information corresponding to the wind speed intensity measured in real time, the map information corresponding to the wind speed intensity confirmed from the Meteorological Office information of the day, and the map information corresponding to a strong wind terrain (i.e., a terrain that may be affected by a horizontal wind or a front wind, etc. by topographical characteristics such as a bridge zone, a mountain zone, and an ocean zone) and a time zone (i.e., a time zone that may be affected by the horizontal wind or the front wind, etc. by season and day and night characteristics).

Then, the external device 30 may be a V2X device capable of providing information to the communicating unit 110 through a Vehicle to Everything (V2X) communication network. The V2X device may be, for example, another vehicle for exchanging information through a Vehicle to Vehicle (V2V) method, a road infrastructure for exchanging information through a Vehicle to Infrastructure (V2I) method, a pedestrian device for exchanging information through a Vehicle to Pedestrian (V2P) method, a server for exchanging information through a Vehicle to Network (V2N) method, etc.

In addition, the external device 30 may be a driver terminal capable of providing information through an internal modem mounted inside the vehicle. The driver terminal may be accessed to an external server for exchanging information through a wireless communication network, and a predetermined application may be previously mounted.

Next, the navigation unit 120 obtains wind speed information by using the map information to which the wind speed information is corresponded and the current position information of the vehicle transferred through the communicating unit 110, and generates strong wind zone information by comparing the obtained wind speed information with a predetermined reference wind speed to determine a strong wind zone.

As described above, the navigation unit 120 includes the map information updating unit 121, the map information storing unit 122, the strong wind zone determining unit 123, and the GPS 124, and may further include a path setting unit (not illustrated) for performing a normal navigation function, a display unit (not illustrated), a voice guiding unit (not illustrated), etc.

Specifically, the map information updating unit 121 updates the map information to which the wind speed information is corresponded transferred from the communicating unit 110 to the map information storing unit 122, and the map information storing unit 122 stores the map information.

The strong wind zone determining unit 123 obtains the wind speed information of the current position by matching the map information stored in the map information storing unit 122 with the current position information of the vehicle confirmed through the GPS 124, and generates the strong wind zone information by comparing the obtained wind speed information with the predetermined reference wind speed to determine whether it is the strong wind zone. At this time, the strong wind zone determining unit 123 transmits the strong wind zone information to the strong wind traveling situation determining unit 140.

Herein, the strong wind zone information may be defined as a strong wind zone when the wind speed information determined based on the current position information of the vehicle is equal to or greater than the predetermined reference wind speed. In addition, the strong wind zone information may define a plurality of strong wind zones through a plurality of reference wind speeds in defining the strong wind zone. Then, the strong wind zone information may be defined as a dangerous strong wind zone when the wind speed information is equal to or greater than a predetermined dangerous reference wind speed.

Next, the strong wind traveling situation determining unit 140 generates the strong wind traveling situation information to transfer it to the control signal generating unit 150 by determining the strong wind traveling situation by using the strong wind zone information transferred from the navigation unit 120, that is, the strong wind zone determining unit 123 and the vehicle speed information transferred through the vehicle speed measuring unit 130. The vehicle speed measuring unit 130 measures the vehicle speed information of the current position.

Herein, the strong wind traveling situation information is information related to the strong wind zone information and the vehicle speed information, confirmed as the strong wind zone through the strong wind zone information, and defined as the strong wind traveling situation when it is confirmed that an actual vehicle speed is equal to or greater than a predetermined reference vehicle speed through the vehicle speed information.

Then, the strong wind traveling situation information may define a plurality of strong wind traveling situations through a plurality of reference vehicle speeds, and define the plurality of strong wind traveling situations through the plurality of strong wind zones.

Therefore, the strong wind traveling situation information may define the plurality of strong wind traveling situations by using the matrix in which the mutual correlation between the plurality of reference vehicle speeds and the plurality of strong wind zones has been defined.

In addition, the strong wind traveling situation information may be defined as a dangerous strong wind traveling situation when the actual vehicle speed of the vehicle is equal to or greater than the predetermined dangerous reference vehicle speed and corresponds to the dangerous strong wind zone. For this purpose, the dangerous reference vehicle speed and the dangerous strong wind zone may be preset.

The strong wind traveling situation determining unit 140 may previously determine a vehicle height adjusting execution time point considering the distance between the current position of the vehicle and the starting position of the strong wind zone on the traveling path of the vehicle. Therefore, the strong wind traveling situation determining unit 140 transmits the strong wind traveling situation information to the control signal generating unit 150 according to the determined vehicle height adjusting execution time point.

Next, the control signal generating unit 150 generates a control signal of the vehicle height adjusting device 10 by using the strong wind traveling situation information transferred from the strong wind traveling situation determining unit 140. That is, the control signal generating unit 150 generates the control signal of the vehicle height adjusting device 10 corresponding to the reference vehicle speed and the strong wind zone of the strong wind traveling situation information through the control signal generating matrix of FIG. 2.

Herein, the vehicle height adjusting device 10 may be any one of an air suspension, an electric type, and a hydraulic type.

In addition, the control signal generating unit 150 may obtain the respective control signals according to the plurality of strong wind traveling situation information from a predetermined control signal generating matrix as in FIG. 2.

Referring to FIG. 2, the control signal generating matrix represents the plurality of strong wind traveling situation information corresponding to the plurality of strong wind zones and the plurality of reference vehicle speeds, and each of the plurality of strong wind traveling situation information defines a control value (i.e., a control signal) for controlling the vehicle height control apparatus 100.

As described above, the strong wind zone is defined when the wind speed information determined based on the current position information of the vehicle is equal to or greater than the predetermined reference wind speed, such that it is defined when being equal to or greater than a first wind speed intensity.

Then, the strong wind traveling situation is defined when the strong wind zone is equal to or greater than the first wind speed intensity, and the actual vehicle speed is equal to or greater than the predetermined reference vehicle speed, such that it is defined when being equal to or greater than a first reference vehicle speed. That is, in the control signal generating matrix of FIG. 2, the plurality of strong wind traveling situations are denoted by a display region A, and defined separately according to the plurality of strong wind zones and the plurality of reference vehicle speeds, respectively.

The strong wind zone information is defined as a dangerous strong wind zone when the wind speed information is equal to or greater than the predetermined dangerous reference wind speed, and the strong wind traveling situation information is confirmed as the dangerous strong wind zone through the strong wind zone information and defined as the dangerous strong wind traveling situation when it is confirmed that the actual vehicle speed is equal to or greater than the predetermined dangerous reference vehicle speed through the vehicle speed information.

In this case, the strong wind traveling situation determining unit 140 transfers the strong wind traveling situation information on the dangerous strong wind traveling situation to the control signal generating unit 150, and the control signal generating unit 150 generates a control signal for controlling the braking device of the vehicle according to the strong wind traveling situation information on the dangerous strong wind traveling situation.

In addition, the control signal generating unit 150 may also generate a control signal for controlling the braking device 20 of the vehicle according to the dangerous strong wind traveling situation. For example, the control signal for controlling the braking device 20 may be a control signal for decelerating the vehicle speed of the vehicle to a predetermined ratio (5%, 10%, etc.).

Figure 3:
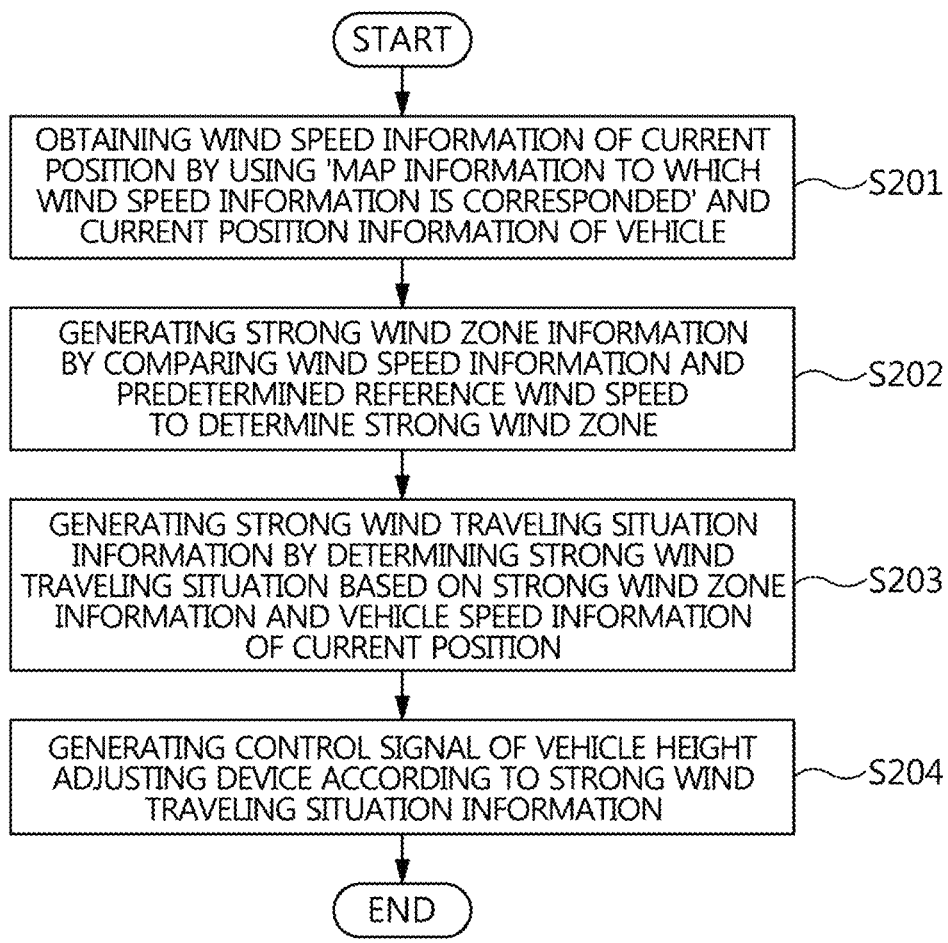
FIG. 3 is a diagram illustrating a vehicle height control method considering a strong wind traveling situation according to an exemplary embodiment of the present disclosure.

FIG. 3 is a diagram illustrating a vehicle height control method considering a strong wind traveling situation according to an exemplary embodiment of the present disclosure.

First, the vehicle height control apparatus 100 obtains wind speed information of a current position by using map information to which the wind speed information is corresponded and current position information of a vehicle S201. At this time, the vehicle height control apparatus 100 receives the map information from an external device before obtaining the wind speed information, updates a portion required for updating, and then stores and provides it.

Herein, the external device is at least one of a vehicle-to-everything (V2X) device for providing information through a V2X communication network, or a driver terminal for providing information through an internal modem mounted inside the vehicle.

Thereafter, the vehicle height control apparatus 100 generates strong wind zone information by comparing the wind speed information with a predetermined reference wind speed to determine a strong wind zone S202. Herein, the strong wind zone information is defined as a strong wind zone when the wind speed information is equal to or greater than the predetermined reference wind speed, and a plurality of strong wind zones are defined through a plurality of reference wind speeds.

Then, the vehicle height control apparatus 100 generates strong wind traveling situation information by determining the strong wind traveling situation based on the strong wind zone information and the vehicle speed information S203. Herein, the strong wind traveling situation information is confirmed as the strong wind zone through the strong wind zone information, and defined as the strong wind traveling situation when it is confirmed that an actual vehicle speed is equal to or greater than the predetermined reference vehicle speed through the vehicle speed information. In addition, the strong wind traveling situation information defines the plurality of strong wind traveling situations through the plurality of reference vehicle speeds, and defines the plurality of strong wind traveling situations through the plurality of strong wind zones.

Then, the vehicle height control apparatus 100 generates a control signal of the vehicle height adjusting device 10 according to the strong wind traveling situation information S204. At this time, the vehicle height control apparatus 100 obtains the respective control signals according to the plurality of strong wind traveling situations to transmit it to the vehicle height adjusting device 10.

The strong wind zone information is defined as a dangerous strong wind zone when the wind speed information is equal to or greater than a predetermined dangerous reference wind speed, and the strong wind traveling situation information is confirmed as a dangerous strong wind zone through the strong wind zone information and defined as the dangerous strong wind traveling situation when it is confirmed that the actual vehicle speed is equal to or greater than the predetermined dangerous reference vehicle speed through the vehicle speed information.

Then, the vehicle height control apparatus 100 may generate a control signal for controlling the braking device of the vehicle according to the strong wind traveling situation information in which the dangerous strong wind traveling situation has been defined.

Then, the vehicle height control apparatus 100 previously determines a vehicle height adjusting execution time point of the vehicle height adjusting device 10 considering the distance between the current position of the vehicle and the starting position of the strong wind zone on the traveling path of the vehicle.

Herein, the S201 and the S202 are performed by the strong wind zone determining unit 123 of the navigation unit 120, the S203 is performed by the strong wind traveling situation determining unit 140, and the S204 is performed by the control signal generating unit 150.

The vehicle height control apparatus 100 may enhance the fuel efficiency of the vehicle by 2% or more through the vehicle height control with respect to the wind. For example, when the vehicle height of the vehicle lowers by 10 mm, a drag coefficient $C_D$ is reduced by 0.003 to 5. When the $C_D$ is about 0.3, the fuel efficiency is saved by 1.4%. When the vehicle height lowers by 30 mm, the high-speed fuel efficiency is lowered by 2.1%. Herein, the drag coefficient is a resistance coefficient by the wind and is better as it is lowered, and when the normal drag coefficient is reduced by 10%, the high-speed fuel efficiency is enhanced by 2.1%.

The method in accordance with some embodiments may be implemented in the form of program instructions that may be executed through various computer means to be recorded on a computer readable medium. The computer-readable medium may include program instruction, data file, data structure, and the like, alone or in combination thereof. The program instruction recorded on the medium may be those specially designed and constructed for the present disclosure, or may be known and available to those skilled in the art of computer software. Examples of the computer-readable medium include magnetic media such as a hard disk, a floppy disk, and a magnetic tape, optical media such as CDROM and DVD, magneto-optical media such as a floptical disk, and a hardware device specifically configured to store and execute program instructions such as ROM, RAM, and flash memory. Examples of the program instruction include machine language code such as those generated by a compiler, as well as high-level language code that may be executed by a computer using an interpreter or the like.

Although the present disclosure has been described with a focus on novel features of the present disclosure applied to various embodiments, it will be apparent to those skilled in the art that various deletions, substitutions, and changes in the form and details of the apparatus and method described above may be made without departing from the scope of the present disclosure. Therefore, the scope of the present disclosure is defined by the appended claims rather than by the foregoing description. All modifications within the equivalent scope of the appended claims are embraced within the scope of the present disclosure.

What is claimed is:

1. A vehicle height control apparatus considering a strong wind traveling situation, the vehicle height control apparatus comprising:
    a strong wind zone determining unit for obtaining wind speed information of a current position by using map information to which the wind speed information is corresponded and current position information of a vehicle, and generating strong wind zone information by comparing the obtained wind speed information with a predetermined reference wind speed to determine a strong wind zone;
    a strong wind traveling situation determining unit for generating strong wind traveling situation information by determining a strong wind traveling situation based on the strong wind zone information and the vehicle speed information of the current position; and
    a control signal generating unit for generating a control signal of a vehicle height adjusting device according to the strong wind traveling situation information,
    wherein the strong wind traveling situation determining unit previously determines a vehicle height adjusting execution time point of the vehicle height adjusting device considering a distance between the current position of the vehicle and a starting position of the strong wind zone on a traveling path of the vehicle.

2. The vehicle height control apparatus of claim 1, further comprising:
    a communicating unit for receiving the map information to which the wind speed information is corresponded from an external device;
    a map information updating unit for updating the map information to which the wind speed information is corresponded transferred from the communicating unit; and
    a map information storing unit including a memory for storing the map information to which the wind speed information is corresponded updated by the map information updating unit to provide it to the strong wind zone determining unit.

3. The vehicle height control apparatus of claim 2, wherein the external device is at least one of a V2X device for providing information through a V2X communication network, and a driver terminal for providing information through an internal modem mounted inside the vehicle.

4. The vehicle height control apparatus of claim 1, wherein the strong wind zone information is defined as the strong wind zone when the wind speed information is equal to or greater than the predetermined reference wind speed.

5. The vehicle height control apparatus of claim 4, wherein the strong wind zone information defines a plurality of strong wind zones through a plurality of reference wind speeds.

6. The vehicle height control apparatus of claim 1, wherein the strong wind traveling situation information is confirmed as the strong wind zone by the strong wind zone information, and defined as the strong wind traveling situation when it is confirmed that an actual vehicle speed is equal to or greater than a predetermined reference vehicle speed through the vehicle speed information.

7. The vehicle height control apparatus of claim 6, wherein the strong wind traveling situation information defines a plurality of strong wind traveling situations through a plurality of reference vehicle speeds, and
    wherein the control signal generating unit obtains respective control signals according to the plurality of strong wind traveling situations to transmit it to the vehicle height adjusting device.

8. The vehicle height control apparatus of claim 6, wherein the strong wind traveling situation information defines a plurality of strong wind traveling situations through a plurality of strong wind zones, and
    wherein the control signal generating unit obtains the respective control signals according to the plurality of strong wind traveling situations to transmit it to the vehicle height adjusting device.

9. The vehicle height control apparatus of claim 1, wherein the strong wind zone information is defined as a dangerous strong wind zone when the wind speed information is equal to or greater than a predetermined dangerous reference wind speed,
    wherein the strong wind traveling situation information is confirmed as the dangerous strong wind zone through the strong wind zone information, and defined as a dangerous strong wind traveling situation when it is confirmed that an actual vehicle speed is equal to or greater than a predetermined dangerous reference vehicle speed through the vehicle speed information, and
    wherein the control signal generating unit generates a control signal for controlling a braking device of the vehicle according to the strong wind traveling situation information in which the dangerous strong wind traveling situation has been defined.

10. The vehicle height control apparatus of claim 2,
wherein at least one of the map information updating unit, the strong wind zone determining unit, the strong wind traveling situation determining unit, and the control signal generating unit is composed of an integral controller.

11. A vehicle height control method considering a strong wind traveling situation, the vehicle height control method comprising steps of:
obtaining wind speed information of a current position by using map information to which the wind speed information is corresponded and current position information of a vehicle;
generating strong wind zone information by comparing the obtained wind speed information with a predetermined reference wind speed to determine a strong wind zone;
generating strong wind traveling situation information by determining a strong wind traveling situation based on the strong wind zone information and vehicle speed information of the current position; and
generating a control signal of a vehicle height adjusting device according to the strong wind traveling situation information,
wherein the step of generating strong wind traveling situation information previously determines a vehicle height adjusting execution time point of the vehicle height adjusting device considering a distance between a current position of the vehicle and a starting position of the strong wind zone on a traveling path of the vehicle.

12. The vehicle height control method of claim 11, further comprising:
receiving the map information to which the wind speed information is corresponded from an external device before obtaining the wind speed information of the current position of the vehicle;
updating the received map information to which the wind speed information is corresponded; and
storing and providing the updated map information to which the wind speed information is corresponded.

13. The vehicle height control method of claim 12,
wherein the external device is at least one of a V2X device for providing information through a V2X communication network, and a driver terminal for providing information through an internal modem mounted inside the vehicle.

14. The vehicle height control method of claim 11,
wherein the strong wind zone information is defined as the strong wind zone when the wind speed information is equal to or greater than the predetermined reference wind speed.

15. The vehicle height control method of claim 14,
wherein the strong wind zone information defines a plurality of strong wind zones through a plurality of reference wind speeds.

16. The vehicle height control method of claim 11,
wherein the strong wind traveling situation information is confirmed as the strong wind zone by the strong wind zone information, and defined as the strong wind traveling situation when it is confirmed that an actual vehicle speed is equal to or greater than a predetermined reference vehicle speed through the vehicle speed information.

17. The vehicle height control method of claim 16,
wherein the strong wind traveling situation information defines a plurality of strong wind traveling situations through a plurality of reference vehicle speeds, and
wherein the generating the control signal of the vehicle height adjusting device obtains respective control signals according to the plurality of strong wind traveling situations to transmit it to the vehicle height adjusting device.

18. The vehicle height control method of claim 16,
wherein the strong wind traveling situation information defines a plurality of strong wind traveling situations through a plurality of strong wind zones, and
wherein the generating the control signal of the vehicle height adjusting device obtains the respective control signals according to the plurality of strong wind traveling situations to transmit it to the vehicle height adjusting device.

19. The vehicle height control method of claim 11,
wherein the strong wind zone information is defined as a dangerous strong wind zone when the wind speed information is equal to or greater than a predetermined dangerous reference wind speed,
wherein the strong wind traveling situation information is confirmed as the dangerous strong wind zone through the strong wind zone information, and defined as a dangerous strong wind traveling situation when it is confirmed that an actual vehicle speed is equal to or greater than a predetermined dangerous reference vehicle speed through the vehicle speed information, and
wherein the generating the control signal of the vehicle height adjusting device generates a control signal for controlling a braking device of the vehicle according to the strong wind traveling situation information in which the dangerous strong wind traveling situation has been defined.

* * * * *